(12) United States Patent
Hardick et al.

(10) Patent No.: US 11,618,559 B2
(45) Date of Patent: Apr. 4, 2023

(54) ROTOR BLADE SYSTEM

(71) Applicant: LEONARDO UK LIMITED, London (GB)

(72) Inventors: Mark Hardick, Yeovil Somerset (GB); Simon Stacey, Yeovil Somerset (GB)

(73) Assignee: LEONARDO UK LIMITED

(*) Notice: Subject to any disclaimer, the term of this patent is extended or adjusted under 35 U.S.C. 154(b) by 665 days.

(21) Appl. No.: 15/313,252

(22) PCT Filed: May 28, 2015

(86) PCT No.: PCT/GB2015/051552
§ 371 (c)(1),
(2) Date: Nov. 22, 2016

(87) PCT Pub. No.: WO2015/181552
PCT Pub. Date: Dec. 3, 2015

(65) Prior Publication Data
US 2017/0183089 A1    Jun. 29, 2017

(30) Foreign Application Priority Data

May 28, 2014    (GB) ..................... 1409424

(51) Int. Cl.
*B64C 27/615*    (2006.01)
*B64C 27/467*    (2006.01)
(Continued)

(52) U.S. Cl.
CPC ............ *B64C 27/615* (2013.01); *B64C 27/04* (2013.01); *B64C 27/467* (2013.01);
(Continued)

(58) Field of Classification Search
CPC ... B64C 27/615; B64C 27/473; B64C 27/467; B64C 27/04; B64C 27/72; B64C 2027/7222; B64C 2027/7266; Y02T 50/34
See application file for complete search history.

(56) References Cited

U.S. PATENT DOCUMENTS

| | | |
|---|---|---|
| 2,392,443 A | 1/1946 | Youngman |
| 2,428,936 A | 10/1947 | Hunter |

(Continued)

FOREIGN PATENT DOCUMENTS

| | | |
|---|---|---|
| CN | 101708773 | 5/2010 |
| EP | 1262404 | 12/2002 |

(Continued)

OTHER PUBLICATIONS

European Patent Office, Appn: 15727053.9-1010; Ref: G13459EP-TMA-db, Oct. 22, 2019.

*Primary Examiner* — Richard A Edgar
(74) *Attorney, Agent, or Firm* — Morgan, Lewis & Bockius LLP

(57) ABSTRACT

A rotor blade system having a plurality of rotor blades, wherein at least one of the rotor blades includes an outer surface having generally opposing first and second surfaces, the rotor blade including a fluid flow altering surface positioned relative to one of the first or second surfaces which is moveable between first and second positions, wherein movement of the fluid flow altering surface is effected by an expandable member.

15 Claims, 5 Drawing Sheets

(51) Int. Cl.
*B64C 27/473* (2006.01)
*B64C 27/72* (2006.01)
*B64C 27/04* (2006.01)

(52) U.S. Cl.
CPC ............ *B64C 27/473* (2013.01); *B64C 27/72* (2013.01); *B64C 2027/7222* (2013.01); *B64C 2027/7266* (2013.01); *Y02T 50/30* (2013.01)

(56) References Cited

U.S. PATENT DOCUMENTS

| | | | |
|---|---|---|---|
| 3,158,338 A | | 11/1964 | Cushman |
| 3,586,267 A | * | 6/1971 | Ingelman-Sundberg ..................... B64C 9/32 244/203 |
| 5,106,265 A | * | 4/1992 | Holzem ................ F03D 7/0252 416/23 |
| 5,492,448 A | * | 2/1996 | Perry ........................ B64C 3/14 416/228 |
| 6,209,824 B1 | * | 4/2001 | Caton ....................... B64C 7/00 244/213 |
| 7,246,524 B1 | * | 7/2007 | Kholwadwala ........... B64C 3/46 73/715 |
| 8,491,262 B2 | * | 7/2013 | McGrath ............... F03D 7/0252 416/1 |
| 8,647,059 B1 | * | 2/2014 | Szefi ...................... B64C 27/72 416/1 |
| 9,033,661 B2 | * | 5/2015 | Pesetsky ............... F03D 1/0633 416/23 |
| 9,267,491 B2 | * | 2/2016 | Vossler ................. F03D 7/0252 |
| 2011/0266391 A1 | | 11/2011 | Kothera et al. |
| 2012/0141271 A1 | * | 6/2012 | Southwick ............ F03D 1/0633 416/23 |
| 2013/0259681 A1 | * | 10/2013 | Perlman .................. B64C 27/72 416/1 |
| 2013/0336787 A1 | | 12/2013 | Brewer et al. |
| 2017/0129596 A1 | * | 5/2017 | Cave ...................... B64C 27/72 |

FOREIGN PATENT DOCUMENTS

| | | |
|---|---|---|
| EP | 2514668 | 10/2012 |
| EP | 2631175 | 12/2012 |
| EP | 2548798 | 1/2013 |
| GB | 1359642 | 7/1974 |
| JP | 9-254893 | 9/1997 |

* cited by examiner

ROTOR BLADE SYSTEM

TECHNICAL FIELD

This invention relates to a rotor blade system which in use is subject to fluid flow. More particularly, but not exclusively, the invention relates to a rotor blade system for a rotary wing aircraft such as a helicopter.

The invention has application to other rotor blade systems, as persons skilled in the art will no doubt appreciate, such as for examples only, propellers and turbine blades.

BACKGROUND

A rotor blade system typically includes a plurality of rotor blades which are connected to each other and rotate around an axis. The rotor blades for example, have a main body with an outer surface including an upper camber surface and a lower camber surface, and a leading edge and a trailing edge, a blade tip and a root end. The trailing edge particularly of the blade may have attached to it a control surface, such as for example only, a flap, the position of which is variable to affect fluid flow over the blade, for example to improve the performance of the blade, e.g. during the transition between hover and forward flight. For example the flap may be lowered from its usual raised position when the helicopter is in forward flight, to a lowered position to improve performance in hover. One such flap to which the present invention is relevant is what is known as a gurney or wickerbill flap, which is positioned at the trailing edge of a rotor blade.

SUMMARY OF THE INVENTION

According to a first aspect of the invention we provide a rotor blade system with a plurality of rotor blades, wherein at least one of the rotor blades includes an outer surface having generally opposing first and second surfaces, the rotor blade including a fluid flow altering surface positioned relative to one of the first or second surfaces which is moveable between first and second positions, wherein movement of the fluid flow altering surface is effected by an expandable member.

Further features of the first aspect of the invention are set out in claims appended hereto.

According to a second aspect of the invention we provide a helicopter having a rotor blade system according to the first aspect of the invention.

According to a third aspect of the invention we provide a rotor blade system having a plurality of rotor blades, with each blade including an outer surface having generally opposing first and second surfaces, each rotor blade including a fluid flow altering surface positioned relative to one of the first or second surfaces which is moveable between first and second positions, wherein movement of the fluid flow altering surface is effected by an expandable member,

BRIEF DESCRIPTION OF THE DRAWINGS

Embodiments of the invention will now be described with reference to the accompanying drawings in which:—

DETAILED DESCRIPTION

Figure 1:
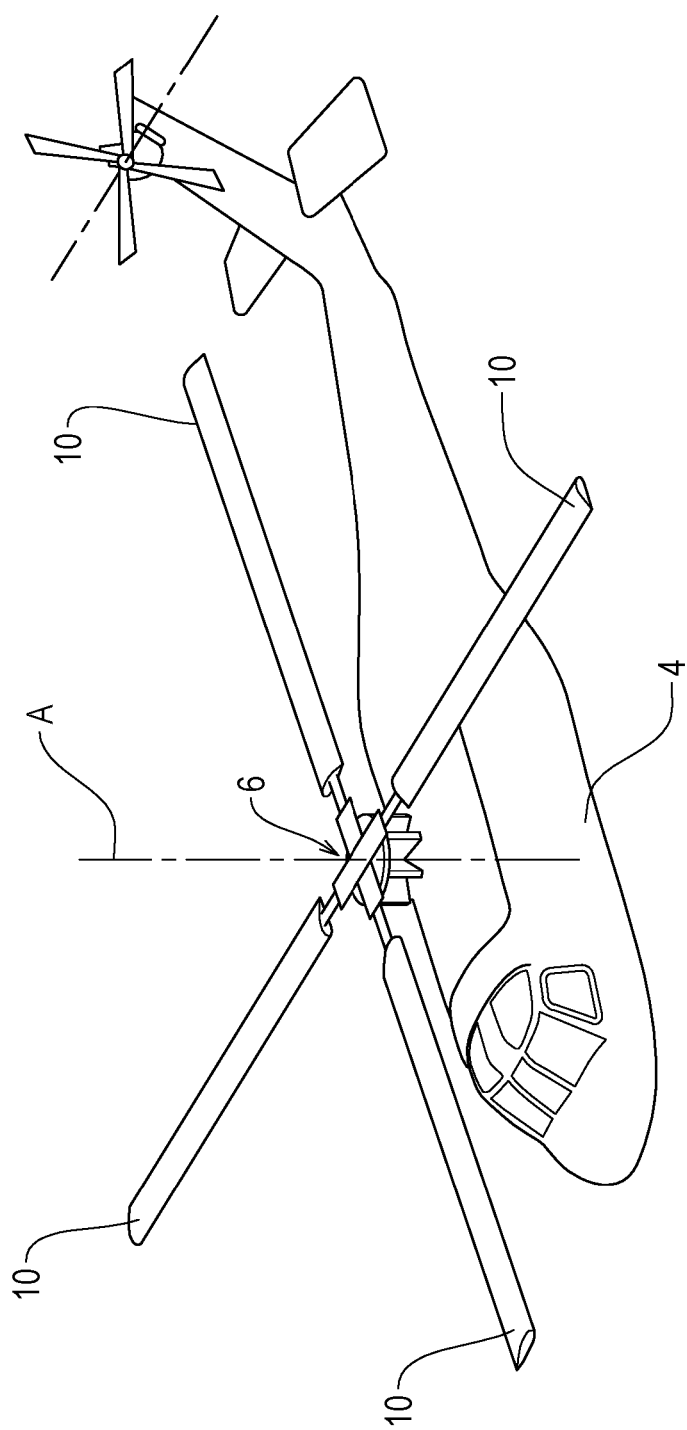
FIG. 1 is an illustrative view of a helicopter with a rotor blade system in accordance with the present invention.

Referring firstly to FIG. 1, this shows a rotor blade system 6 in accordance with the present invention. The rotor blade system 6 comprises a plurality of (four) rotor blades 10 which in this embodiment are substantially identical to each other. It should be appreciated that fewer or more blades could be utilised without departing from the scope of the present invention.

Figure 2:
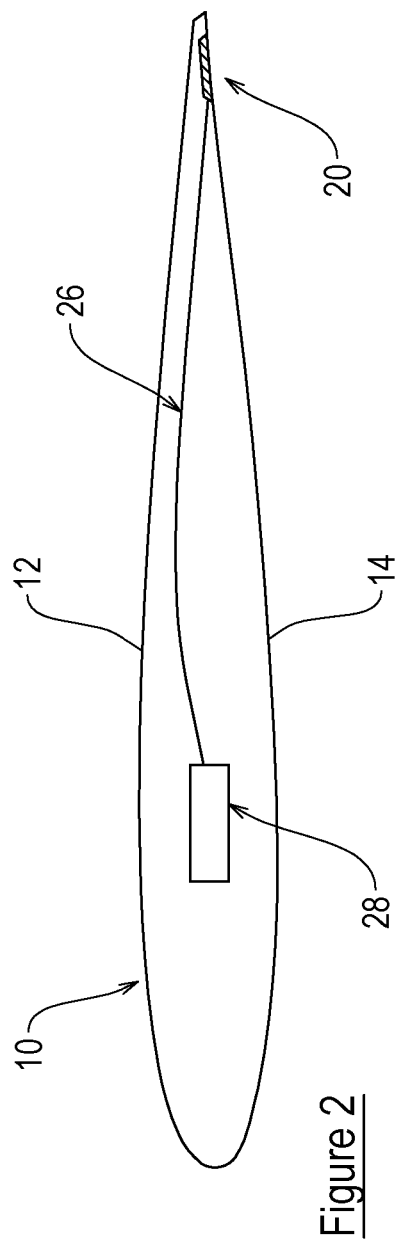
FIG. 2 is a schematic cross-sectional side view of the rotor blade in accordance with the present invention.
Figure 3:
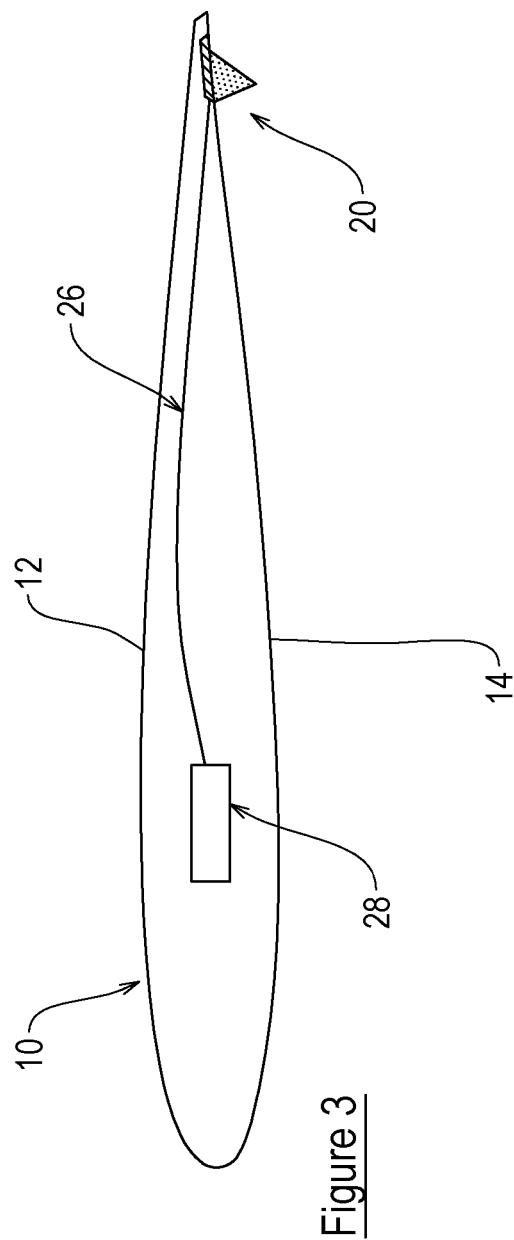
FIG. 3 is a further schematic cross-sectional side view of the rotor blade in accordance with the present invention.

The schematic cross-sectional views of FIGS. 2 and 3 show an example of a rotor blade 10 that includes a first, upper, surface 12 and a second, lower, surface 14 which together define the external surface of the blade. The surfaces are generally opposite each other as to be expected from a rotor blade.

The rotor blade 10 includes a fluid flow altering surface 20 which is positioned on an underside of the blade 10. The surface 20 forms a continuous surface with the lower surface 14 and is positioned towards to trailing edge 21 of the rotor blade 10. The surface 20 is moveable between first (FIG. 2) and second (FIG. 3) positions. In the first position in FIG. 2 the surface 20 is positioned in line with the second surface 14 such that it offers a continuous surface. In the second position, it can be seen that the surface 20 extends outwardly from the surface 14 such as to engage with the flow of fluid, e.g. air, passing over the surface 14.

Figure 4:
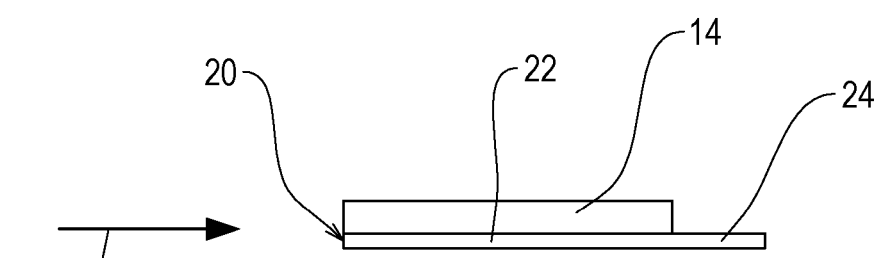
FIG. 4 is a schematic cross-sectional side view of a fluid flow altering surface in accordance with the present invention shown in a first position.
Figure 7:
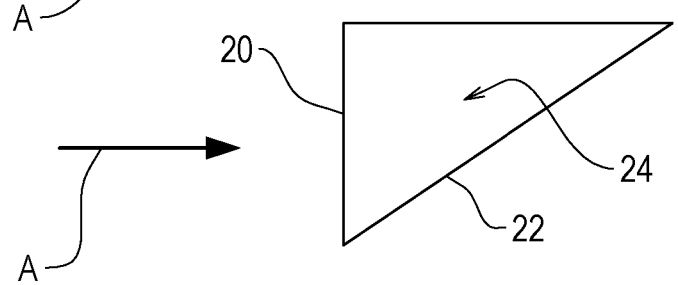
FIG. 7 is a schematic cross-sectional side view of a fluid flow altering surface in accordance with the present invention shown in a second position.
Figure 8:
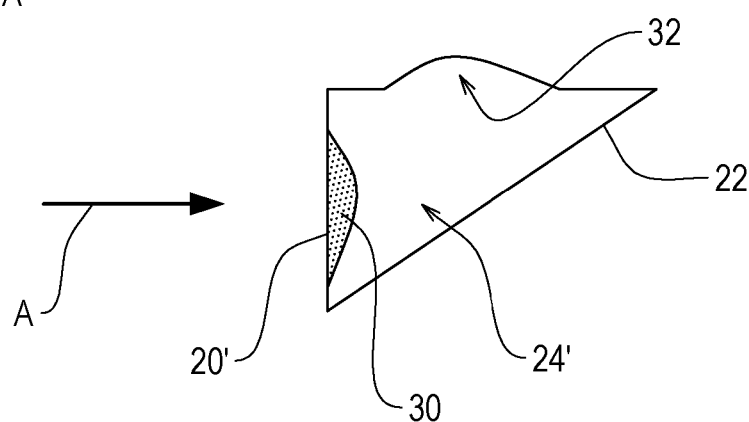
FIG. 8 is a schematic cross-sectional side view of an alternative embodiment of a fluid flow altering surface in accordance with the present invention shown in a second position.

The surface 20 in this embodiment is a surface of an expandable member 22 which is moveable between its first and second positions, (see FIGS. 4, 7 and 8).

Figure 5:
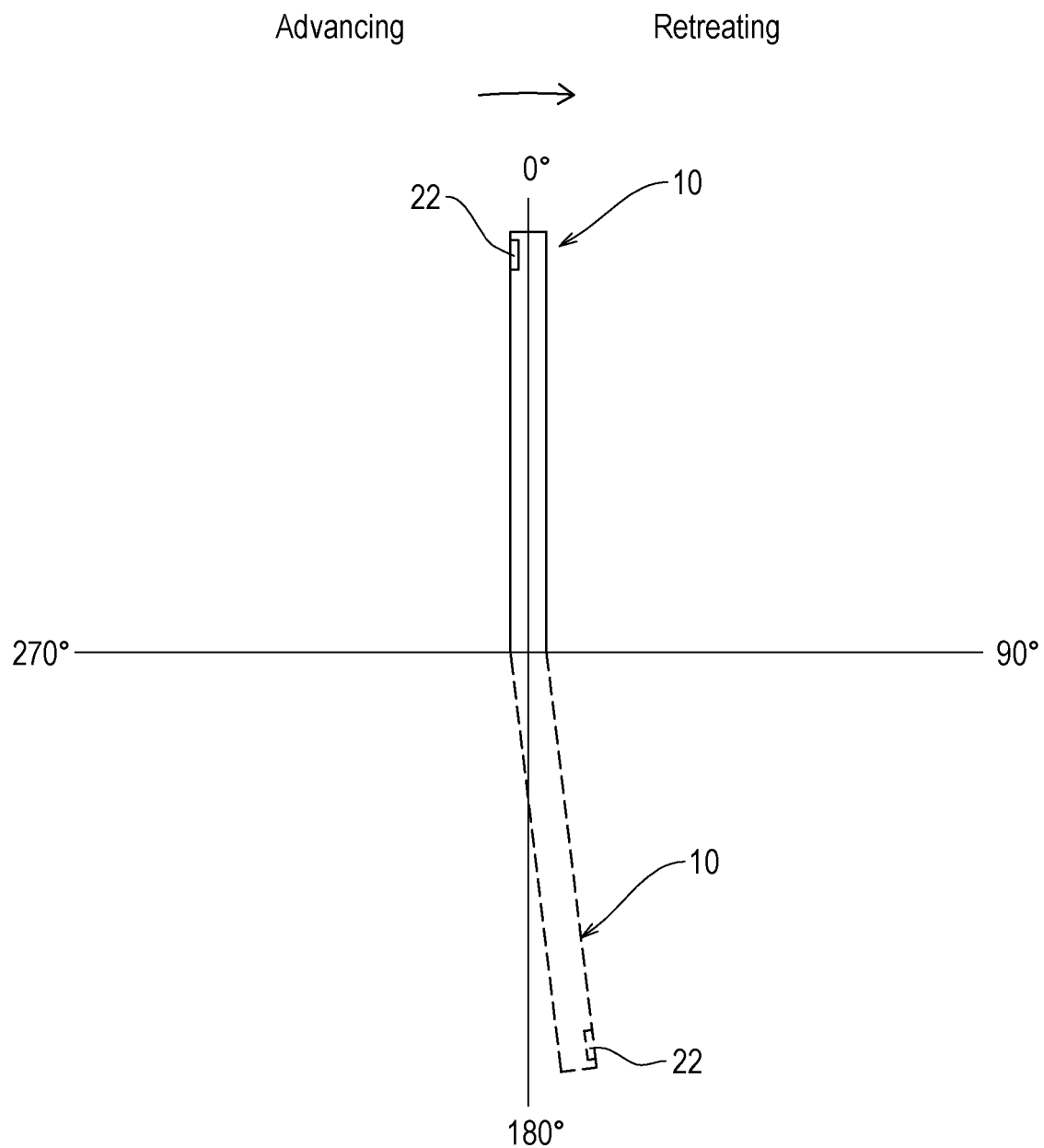
FIG. 5 is an underside view of a rotor blade in accordance with the present invention during a cycle of the rotor blade system.

The system includes one or more sensors (not shown) for sensing the angular position of each blade (and thus its respective expandable member 22) about its rotational axis A. The system also includes one or more controllers capable of receiving a signal(s) from the sensor(s) and for effecting movement of the expandable member between its first and second positions depending upon the sensed position of each blade about the axis A. In a first operative state (as shown in FIG. 5) it can be seen that as the rotor blade 10 starts to retreat, i.e. approaches or goes past 0°, the expandable member 22 is moved into its second position. Similarly, as or shortly before, the expandable member reaches an angular position corresponding to advancing of the blade, i.e. 180°, the expandable member 22 is moved back into its first position. In a most preferred operation, the expandable member 22 is moved to its first position before the blades passes 180° and thus before the blade starts to advance.

In a second operative state of the system, the (preferably all) expandable member 22 is held in its second position for the entire cycle, e.g. when the helicopter is travelling at a relatively low speed.

Figure 6:
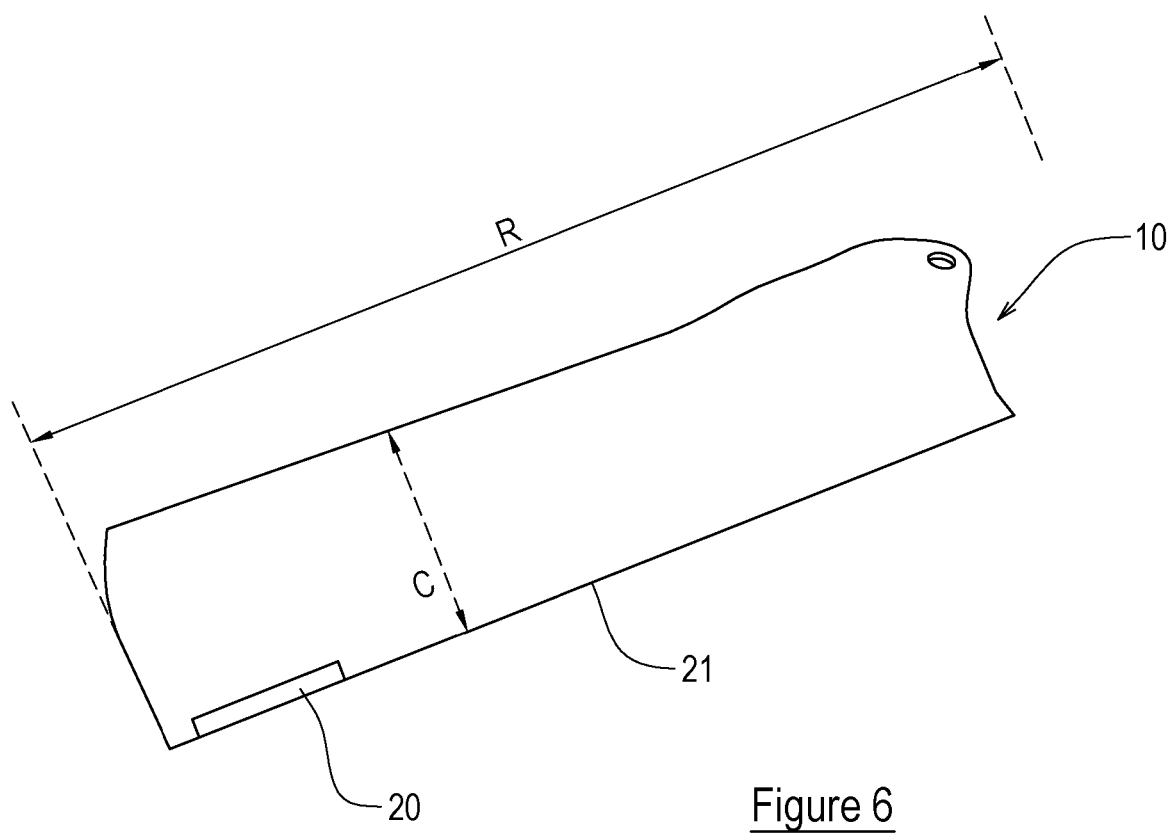
FIG. 6 is a perspective view of a rotor blade according to the present invention.

FIG. 6 shows an example of the location of the expandable member 22 on an underside of the rotor blade 10. The rotor blade 10 has a root span R, a chord length C and a trailing edge 21. It has been found that it is preferable for the expandable member 22 to extend lengthwise between 0% to 30% of the chord length C; even more preferably to extend between 2% and 20%, and most preferably to extend between 5% and 10% of the chord length C, and be positioned on the trailing edge 21 of the rotor blade. The expandable member 22 is preferably also positioned at or near the tip edge of a rotor blade, and preferably extends width-wise between 10% to 20% of the root span length R, along the trailing edge 21 of the rotor blade 10. The expandable member 22 could also be positioned between 10% to 20% of the root span length R from the tip edge.

In this particular example the expandable member 22 is made from a flexible material which is resiliently flexible. For example, the material may be a polymeric material of a fibre-reinforced polymer.

A particularly effective polymeric material for the expandable member 22 should be capable of withstanding internal inflated pressures in the range of 10 PSI to 30 PSI, preferably 15 PSI to 20 PSI.

It will be appreciated, however, that the expandable member 22 could be made from any desirable material so long as it is capable of expanding between first and second conditions which correspond to the first and second positions of the surface 20.

It can be seen that the expandable member 22 includes a cavity 24 for receiving a fluid. The flow may be a gas or liquid and the cavity 24 may be connected by way of a conduit 26 to a fluid source in order to provide a passage for fluid (e.g. gas or liquid) into and out from the cavity 24.

As can be seen in FIGS. 2 and 3 the system also includes a fluid movement device in the form of a pump 28 capable of urging fluid into the cavity 24 and drawing fluid from the cavity 24. Thus, the pump 28 is capable of increasing the pressure in the conduit 26 and thus the cavity 24 in order to move the expandable member 22 from its first to its second position.

Thus, the expandable member 22 expands from its first condition (see FIG. 4) to its second condition (see FIG. 7) by increasing the pressure fluid within the cavity 24. Likewise, the expandable member 22 contracts from its second condition to its first condition by decreasing the pressure or volume of fluid within the cavity 24.

Other embodiments could include a system which uses an accumulator to provide positive pressure to the system, or a pump system which can inflate and deflate the expandable member 22. These embodiments are merely suggestions of how the invention could be effected and in no way should be taken to be limiting.

As mentioned previously, when the surface 20 is in its first position (see FIG. 1) the surface 20 does not greatly affect the flow of fluid over the second surface 14. When the surface 20 is in its second condition (see FIG. 3) the surface 20 does affect the flow of fluid over the surface 14. When in the position shown in FIG. 3, the surface 20 is positioned in a plane substantially perpendicular to the surface 14 although it should be appreciated that it can be inclined to any desired angle relative to the surface 14.

Whilst the rotor blade system 6 described could use any shape of rotor blade 10, it has been found to be particularly effective in combination with a blade having a swept back portion at or near its tip.

FIG. 8 shows an alternative embodiment in which the surface 20 includes or is connected to a stiffening member 30 for providing resistance to forces experienced by the surface 20 arising from airflow thereover. The stiffening member 30 is preferably attached to an inwardly/rearwardly facing surface which is opposite to the surface 20. The blade 10 is also provided with a recess 32 in order to receive the stiffening member 30 when the surface 20 is moved to its first, inoperative, position. Thus, it will be seen that the stiffening member 30 is provided within the cavity 24. For both embodiments discussed above the surface 14 may be provided with the recess to receive the whole or a part of the expandable member 22 so that when in the first position it does not greatly affect the airflow over the surface 14.

In embodiments the expandable member may be inflatable and deflatable between its first and second positions and thus the material from which the expandable member is made may likewise by stretchable to enable it to be expanded under inflation and deflated to its previous condition.

Whilst in the embodiments described above the pump 28 is shown within the envelope of the aerofoil blade, between the first and second surfaces 12, 14, it should be appreciated that the pump could be provided elsewhere on the aircraft with a suitable extension of the conduit 26 being provided so as to provide a continuous passage between the pump and the cavity 24.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A rotor blade system having a plurality of rotor blades, wherein at least one of the rotor blades includes an outer surface having generally opposing first and second surfaces, the rotor blade including a fluid flow altering surface positioned relative to one of the first or second surfaces which is moveable between first and second positions, the fluid flow altering surface forming a substantially continuous surface of the first or second surface when in the first position,
wherein movement of the fluid flow altering surface is effected by an expandable member made from a resiliently flexible material and which is inflatable and deflatable, the expandable member including a cavity for receiving a fluid,
wherein the fluid flow altering surface is a surface of the expandable member,
wherein the expandable member is positioned at or close to a tip edge of the rotor blade,
wherein the fluid flow altering surface includes or is connected to a stiffening member for providing resistance to forces experienced by the member or the surface arising from airflow,
wherein the stiffening member is attached to an inwardly facing surface of the fluid flow altering surface,
wherein the respective one of the first or second surfaces includes a recess to receive the whole or a part of the stiffening member and to receive the whole or a part of the expandable member.

2. A rotor blade system according to claim 1 wherein, when the expandable member is in a first condition, the fluid flow altering surface is in its first position, and wherein, when the expandable member is in a second condition, the fluid flow altering surface is in its second position.

3. A rotor blade system according to claim 2 wherein, when the fluid flow altering surface is in its second position, the fluid flow altering surface is substantially perpendicular to the first or second surface of the at least one of the rotor blades.

4. A rotor blade system according to claim 2 wherein, expansion of the expandable member from its first condition to its second condition effects movement of the fluid flow altering surface from its first position to its second position, and wherein, contraction of the expandable member from its second condition to its first condition effects movement of the fluid flow altering surface from its second position to its first position.

5. A rotor blade system according to claim 2 including a sensor for sensing the angular position of the expandable member about an axis of rotation of the rotor blade system and a controller for changing the expandable member between its first and second conditions based on sensed angular position of the expandable member.

6. A rotor blade system according to claim 5 wherein the controller effects movement of the expandable member to its second condition as, or before, the expandable member reaches an angular position corresponding to retreating of the blade.

7. A rotor blade system according to claim 5 wherein the controller effects movement of the expendable member to its first condition as, or before, the expandable member reaches an angular position corresponding to advancing of the blade.

8. A rotor blade system according to claim 2 wherein, when the fluid flow altering surface is in its first position, the fluid flow altering surface does not affect the flow of fluid over the respective one of the first or second surfaces, and wherein when the fluid flow altering surface is in its second position, the fluid flow altering surface does affect the flow of fluid over the respective one of the first or second surfaces.

9. A rotor blade system according to claim 1 wherein the expandable member is made from a polymeric material capable of withstanding pressures in the range of 10 PSI to 30 PSI.

10. A rotor blade system according to claim 9 wherein the expandable member is capable of withstanding pressures in the range of 15 PSI to 20 PSI.

11. A rotor blade system according to claim 1 wherein the expandable member is positioned at a suction side of the rotor blade.

12. A rotor blade system according to claim 1 wherein the expandable member extends lengthwise between 0% and 30% of the chord length.

13. A rotor blade system according to claim 12 wherein the position of the expandable member extends lengthwise between 2% and 20% of the chord length.

14. A rotor blade system according to claim 13 wherein the position of the expandable member extends lengthwise between 5% and 10% of the chord length.

15. A helicopter including a rotor blade system according to claim 1.

\* \* \* \* \*